(12) United States Patent
Roth et al.

(10) Patent No.: US 6,437,461 B1
(45) Date of Patent: Aug. 20, 2002

(54) DEVICE AND METHOD FOR SENSING AN OBJECT OR A PERSON IN THE INTERIOR OF A VEHICLE

(75) Inventors: Christoph Roth, Shinagawa-Ku (JP); Alexander Waldmann, Regensburg (DE); Reinhard Hamperl, Koefering (DE); Thomas Stierle, Regensburg (DE); Reinhard Roesl, Wenzenbach (DE); Gerhard Mader, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/513,624

(22) Filed: Feb. 25, 2000

(30) Foreign Application Priority Data

Feb. 25, 1999 (EP) .............................. 99103695

(51) Int. Cl.$^7$ ................................. B60L 1/00
(52) U.S. Cl. ...................... 307/10.1; 307/9.1; 372/38.02
(58) Field of Search ...................... 347/242; 372/38.02; 369/54; 307/12.1, 9.1; 701/45

(56) References Cited

U.S. PATENT DOCUMENTS

| 5,225,850 A | * | 7/1993 | Egawa et al. ................ 346/108 |
| 5,446,661 A | * | 8/1995 | Gioutsos et al. ........ 364/424.05 |
| 5,782,485 A | * | 7/1998 | Takeda et al. .............. 280/735 |
| 5,835,613 A | | 11/1998 | Breed et al. |

FOREIGN PATENT DOCUMENTS

| EP | 0 669 227 A1 | 8/1995 |
| GB | 21 324 864 A | 11/1998 |

* cited by examiner

*Primary Examiner*—Kim Huynh
*Assistant Examiner*—Robert L. DeBeradinis
(74) *Attorney, Agent, or Firm*—Laurence A. Greenberg; Werner H. Stemer; Ralph E. Locher

(57) ABSTRACT

In order to sense an object or a person in the interior of a vehicle, laser pulses are output by a laser. Sensing devices are provided for sensing a characteristic variable that is decisive for the transmission energy of the laser. The transmission energy is reduced or the emission of a laser pulse is prevented as a function of the sensed characteristic variable.

11 Claims, 3 Drawing Sheets

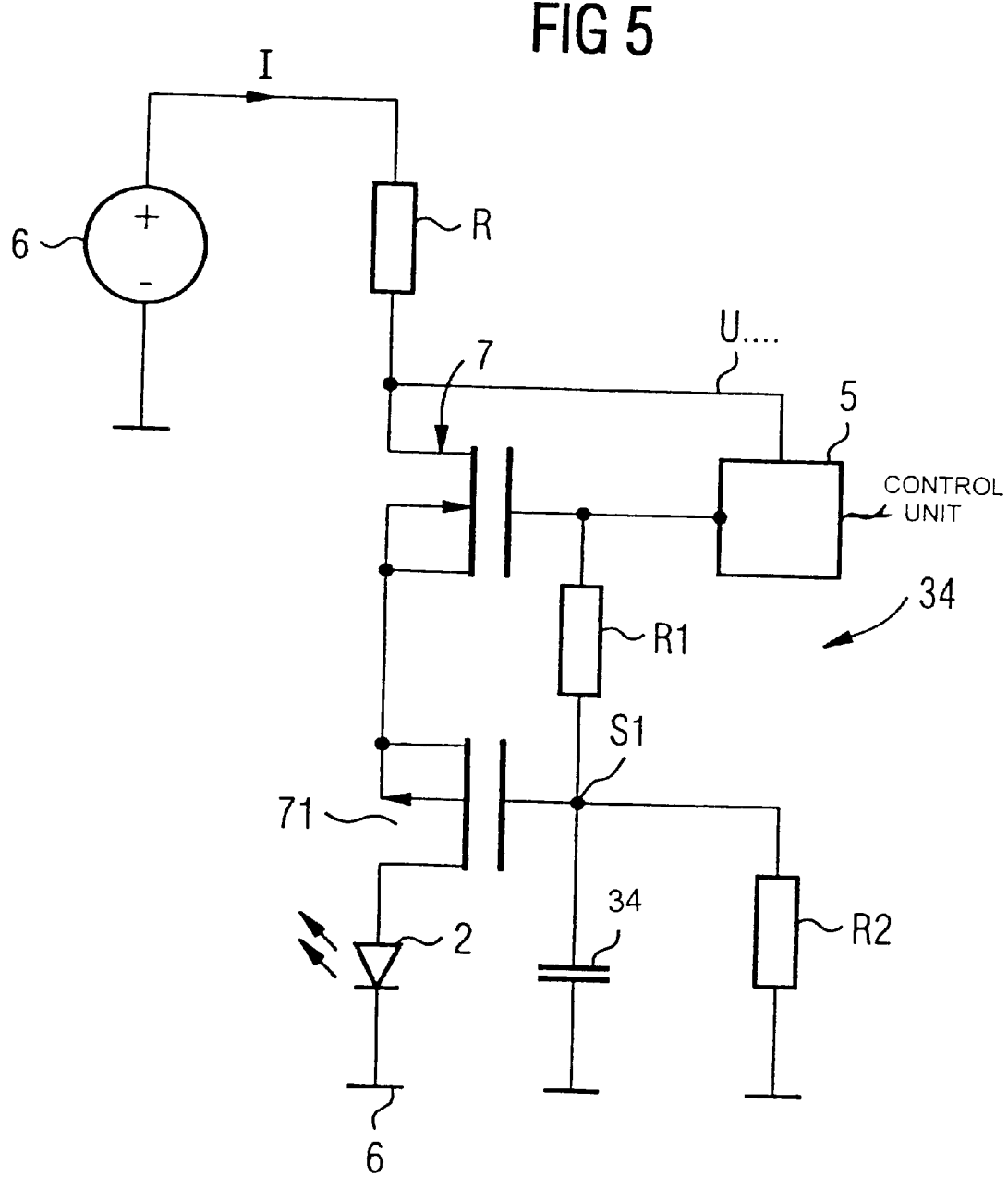

DEVICE AND METHOD FOR SENSING AN OBJECT OR A PERSON IN THE INTERIOR OF A VEHICLE

BACKGROUND OF THE INVENTION

Field of the Invention

The invention relates to a device and a method for sensing an object or a person in the interior of a vehicle with a laser outputting laser pulses.

Persons who are displaced far forward in the direction of a dashboard—such as a child in a child seat positioned on a front passenger seat—are subjected to the hazard, that during the operation of a motor vehicle provided with an airbag, of suffering injuries as result of inflation impact of an airbag in the event of an accident. Modern control systems for personal protection aim at switching off the airbag in such situations or inflating it with reduced momentum in order to avoid the risk of injury to a vehicle occupant. In order to determine the position of the vehicle occupant in the vehicle, use is preferably made of contactless, optical sensors.

A known device for the contactless detection of an object or of a person in the interior of a vehicle is known from Published, European Patent Application EP 0 669 227 A1. In the document, the vehicle seat is irradiated by a number of light-emitting diodes. Beams that are reflected from the seat or a person or an object on the vehicle seat are registered by a photodetector field.

The light source used in the optical sensing system is preferably a laser that permits locationally precise scanning by virtue of its monochrome radiation. Laser diodes, and in particular semiconductor laser diodes, are usually used as transmitters. In order to avoid enduring energy loading of persons in the interior of the vehicle by the laser, the laser is pulse-operated. However, even in this. operating mode, the vehicle occupant must not be adversely affected in terms of health by the output laser pulse in any way.

SUMMARY OF THE INVENTION

It is accordingly an object of the invention to provide a device and a method for sensing an object or a person in the interior of a vehicle which overcome the above-mentioned disadvantages of the prior art devices and methods of this general type, which allows a laser to be used within a sensing device without adversely affecting the health of an occupant of a motor vehicle.

With the foregoing and other objects in view there is provided, in accordance with the invention, a device for sensing an object in an interior of a vehicle, including: a laser outputting a laser pulse; a sensing device for sensing a characteristic variable of a transmission energy of the laser; and a control device for reducing the transmission energy and for preventing the laser pulse from being emitted in dependence on the characteristic variable sensed by the sensing device.

Here, according to the invention, a characteristic variable which is decisive for the transmission energy of the laser is sensed using a suitable device and, on the basis of an evaluation of this characteristic variable, the transmission energy is subsequently reduced, the following emitted laser pulse having a reduced energy content. Alternatively, the outputting of laser pulses is completely prevented. In order to reduce the energy content of a subsequent laser pulse, its power and/or its pulse length are preferably reduced.

The invention provides the advantage that a vehicle occupant located in the area of radiation of the laser but is at no time subjected to an overdose of laser radiation energy. All the standards relating to the radiation loading of persons when using lasers, for example the IEC standard, are complied with by the invention.

The vehicle occupant is also protected against a malfunction of the control unit that operates the laser: such a control unit is usually embodied as a microprocessor that operates the laser and in doing so determines the pulse width and power of the individual laser pulses. owing to a malfunction of the control unit, it is possible, for example, for the pulse width in the software or the hardware of the control unit to be set to infinite. A permanent laser light is thus emitted. If the laser is connected to an energy source by an electric power output stage which can be controlled by the control unit, the invention also permits for the vehicle occupant still to be protected against excessive radiation loading even if the power output stage is defective and switched to a permanently on state.

The device according to the invention detects such a permanent irradiation from the fact that the sensing device picks up a characteristic variable, such as, in particular, the energy content of a laser pulse, the transmission power or a transmission level, which is decisive for the transmission energy of the laser. The control device subsequently evaluates the picked-up characteristic variable/variables. If an increased energy emission of the laser, and an associated increased irradiation of the vehicle occupant is detected, the transmission energy is reduced or the energy emission of the laser is completely prevented.

The sensing device is preferably configured to sense a characteristic variable of the electrical operating energy of the laser, such as, for example, to sense its operating current, or else to sense a characteristic variable of the optically emitted energy of the laser, preferably using an optical receiver. Because of the proportional relationship between the operating energy of the laser and the energy that is emitted by the laser, both energy variables are a measure of the transmission energy of the laser. This selection possibility when determining the characteristic variables permits a low-cost device to be fabricated, depending on the application.

In advantageous developments of the invention, the characteristic variable is either determined by evaluating a single laser pulse or on the basis of an evaluation of a plurality of laser pulses, in particular within a predefined time period.

Characteristic variables are preferably derived both from the first-mentioned short-term consideration and from the last-mentioned long-term consideration. The control device is then active as an actuator element for reducing or preventing the emission of the transmission energy only if both the long-term characteristic variable and the short-term characteristic variable exceed predefined limiting values and thus a continuously unstable operating mode of the laser or of its drive components is detected.

In one advantageous development of the invention, the hardware of the control device is separated from the hardware of the control unit that controls the laser during normal operation. If a faulty control unit is the cause of a continuous laser pulse, this is detected using the control device that is configured so as to be spatially separate.

Other features which are considered as characteristic for the invention are set forth in the appended claims.

Although the invention is 1illustrated and described herein as embodied in a device and a method for sensing an object or a person in the interior of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3 to 5 are electrical block circuit diagrams of the device.

DESCRIPTION OF THE PREFERRED EMBODIMENTS

Figure 1:
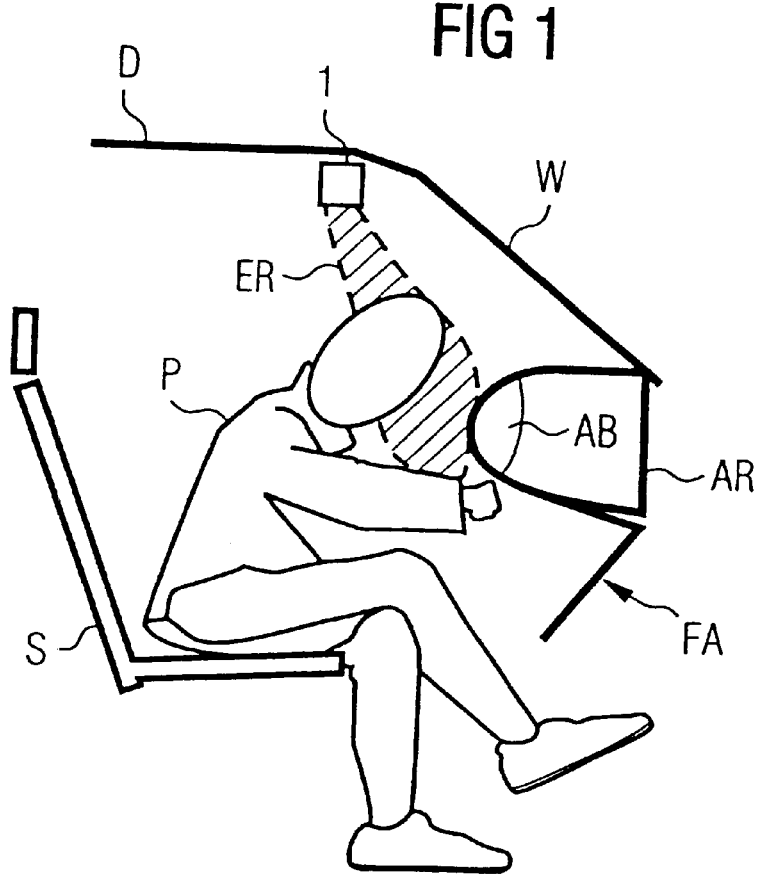
FIG. 1 is a diagrammatic, cross-sectional view of a passenger cell.

In all the figures of the drawing, sub-features and integral parts that correspond to one another bear the same reference symbol in each case. Referring now to the figures of the drawing in detail and first, particularly, to FIG. 1 thereof, there is shown a cross section of a front part of a passenger cell, on a front-seat passenger side, all the elements being drawn symbolically. An interior of a vehicle is bounded by a roof D, a windshield W, a dashboard AR and a foot rest FA. However, in order to bound the interior of the vehicle, the roof D, and thus the enclosed passenger cell, does not necessarily have to be present. A vehicle seat S is shown on which a person P is seated in a position in which an upper part of a body is displaced forward. A device 1 for sensing an object or the person P is disposed in an installation position on the roof D. The device 1 has an indicated effective range ER. The dashboard AR contains a front-seat passenger airbag module AB in a folded-up state. In an unfolded state, the front-seat passenger airbag AB explodes in a direction of a head of the indicated person P. It is clear that with the indicated device 1 for detecting objects the hazard area in front of the folded-up airbag module AB is to be monitored in the inflation direction. If a vehicle occupant or a child seat is detected in this effective range ER, the front-seat passenger airbag module AB is prevented from being triggered, or is triggered in a suitably metered fashion. However, the device 1 can also be directed at the vehicle seat S and sense when a person moves out of his normal seated position. Devices are also known which scan the entire front part of the interior of the vehicle with a plurality of sensors and register any types of positions of objects or persons. The invention is therefore not restricted to specifically sensing an image of an object or of a person, but instead in particular also for monitoring a specific region or a specific zone in the interior of the vehicle for the presence of an object or a person. The device 1 is configured to sense in a contactless fashion.

The sensor of the device 1 scans its effective range by use of optical radiation, in particular infrared radiation. However, radiation with other wavelengths can also be applied. The sensor contains for this a light-emitting diode, in particular an infrared sensor in the form of a laser diode, which emits one or more beams or beam curtains. The sensor also contains one or more optical reception elements in the form of photocells that pick up the scattered radiation that has been reflected at an object or a person. By evaluating the scattered radiation, the distance between the sensor and the object and, if appropriate, contouring and precise determination of the position in two-dimensional or three-dimensional space can be determined. The sensor preferably extends, in the vertical plane, a plurality of beam curtains which are disposed one behind the other in the direction of travel, and contains a plurality of reception elements per beam curtain with respect to the transverse axis of the vehicle. Thus, a three-dimensional detection of persons or objects is ensured because each reception element supplies an item of information with two-dimensional validity, and the third, vertical dimension is acquired by evaluating the strength, the power or the energy content of reflected radiation. A sensing device with simple technical construction has, for example, just one photoelectric barrier that scans the space in which the airbag unfolds. The position of an object or a person is preferably determined using the methods of propagation time measurement or triangulation.

Figure 2:
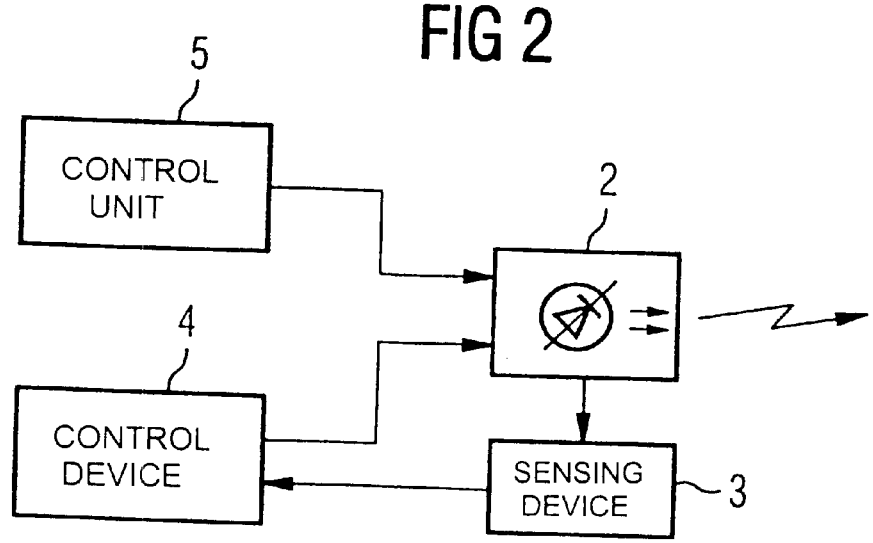
FIG. 2 is a block circuit diagram of a device according to the invention.

FIG. 2 shows a block circuit diagram of the device 1 according to the invention having a laser 2 for outputting laser pulses controlled by a control unit 5. A sensing device 3 is used to pick up a characteristic variable that is decisive for the transmission energy. A control device 4 evaluates the picked-up characteristic variable and intervenes, if appropriate, in the control of the laser 2.

Figure 3:
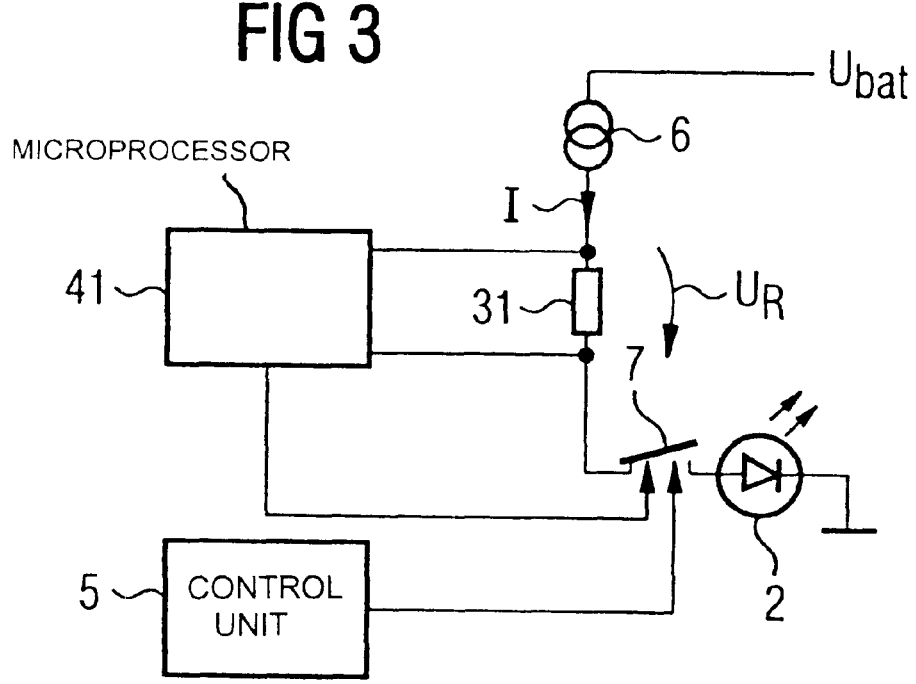

FIG. 3 shows a first circuit diagram of the device 1 according to the invention. Here, the laser 2 is disposed in a form of a laser diode in a circuit having an energy source 6 which is embodied as a current source, a power output stage 7 which is embodied as a switching transistor and a measuring device which is embodied as a current measuring resistor 31. The power output stage 7 is switched alternately on and off by the control unit 5, as a result of which the laser 2 outputs pulsed laser light. A control device which is embodied as a microprocessor 41 or a comparator 41 picks up a voltage drop $U_R$ at the current measuring resistor 31 as a measure of a current I which flows through it and operates the laser 2. The operating current I for the laser is thus used as a sensed characteristic variable which is decisive for the transmission energy of the laser 2 and therefore constitutes a measure of the transmission energy of the laser. The transmission power of the laser 2 can be derived from the operating current I, preferably with reference to a characteristic curve. In addition, a pulse length of the laser pulse is also sensed by the control device 41. The product of the power that is determined and the pulse length which is determined yields the energy content of the laser pulse which is compared with a limiting value. Given an expected constant power emission of the laser, the energy content of a laser pulse can be determined by integrating the power from the start of the pulse. If the energy content that is determined exceeds a limiting value, the control device 41 intervenes in the control of the power output stage 7. In the process, a control signal of the control device 41 is accorded more weight than a control signal of the control unit 5, with the result that even if the control unit 5 wishes to continue to switch the power output stage 7 on, the power output stage 7 is blocked on the basis of an appropriate signal of the control device 41.

Figure 4:
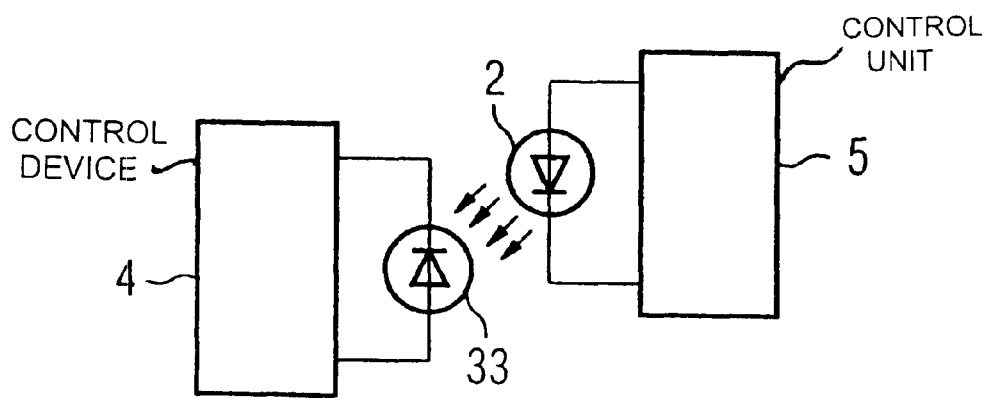

FIG. 4 shows in a merely schematic form a further electrical circuit diagram of the device 1 according to the invention. Here, the control unit 5 activates the laser 2. To sense a characteristic variable for the irradiated energy, a photodiode 33 is used which is sensitive to the light of the wavelength of the laser 2 and is connected to the control device 4. Here, the optical receiver 33 picks up the laser pulse which is output by the laser 2 and converts it into an electrical pulse which is evaluated by the control device 4. In this exemplary embodiment, it is not the operating energy of the laser that is monitored but rather its irradiated energy. To this end, the receiver 33 is preferably disposed and embodied in such a way that it can completely pick up the irradiated transmission energy. To do this, optical devices which contain a laser diode and a photodiode in the smallest possible space are provided in a particular way. The evaluation of the signal supplied by the optical receiver 33 and the intervention method into the driving of the laser 2 are carried out according to statements relating to FIG. 3.

FIG. 5 shows a further exemplary embodiment of the device 1 according to the invention having a circuit composed of a resistor R. the power output stage 7, a further power output stage 71 and the laser 2 between poles of the energy source 6. The power output stage 7 is alternately switched on and off by the control unit 5. If the power output stage 7 and the further power output stage 71 are switched on at the same time, the laser 2 outputs the light pulse of a corresponding length.

In this advantageous development of the invention, a drive signal of the power output stage 7 is sensed and monitored.

In the event of a constant current flow I with correspondingly controlled power output stages 7 and 71 in the circuit, the transmission energy content alone is determined by the pulse length of the energization. The pulse length is predefined by the control unit 5 outputting the drive signal for the power output stage 7.

The drive signal for the power output stage 7 is configured in terms of its voltage in such a way that the power output stage 7 is switched on by the drive signal. The further power output stage 71 is configured in an inverted way, with the result that the voltage which is applied to a control input of the further power output stage 71 via the resistor R1 is low, and thus the further power output stage 71 is switched on. A capacitor 34 is charged by the drive signal via a resistor R1. As the charging of the capacitor 34 increases, the voltage at the switching point S1 rises. For technical reasons, the further controllable power output stage 71 flips over from its on state to its off state starting from a specific voltage value at the switching point S1. Here, the circuit configuration according to FIG. 5 is dimensioned in such a way that given normal pulse widths of the drive pulses for the power output stage 7, the voltage limiting value at the switching point S1, for the purpose of changing the switching state of the further power output stage 71, is not reached by the charging of the capacitor 34. The voltage at the switching point Si rises to such a degree that the switching state of the further power output stage 71 changes from the on state to the off state only if a long permanent identical signal is output, for example owing to a defect in the control unit 5, instead of a brief drive pulse.

If the drive pulse of the control unit 5 is sufficiently short, the capacitor 34 discharges via a resistor R2 in the following low-level phase of the drive signal without the flipping-over point of the power output stage 71 having been reached.

We claim:

1. A device for sensing an object in an interior of a vehicle, comprising:
   a laser outputting a laser pulse into the interior of the vehicle;
   a sensing device for sensing a characteristic variable of a transmission energy of said laser; and
   a control device for reducing the transmission energy and for preventing said laser pulse from being emitted in dependence on the characteristic variable sensed by said sensing device.

2. The device according to claim 1, wherein said sensing device senses a characteristic variable of the laser pulse.

3. The device according to claim 2, wherein said sensing device senses the characteristic variable on a basis of a plurality of output laser pulses.

4. The device according to claim 3, wherein said control device reduces the transmission energy and prevents the laser pulse from being emitted in an event that both the characteristic variable determined on the basis of the plurality of laser pulses and the characteristic variable determined on a basis of said laser pulse each exceed respectively assigned limiting values.

5. The device according to claim 1, wherein said sensing device senses a characteristic variable of an electrical operating energy of said laser.

6. The device according to claim 1, wherein said sensing device senses a characteristic variable of irradiated energy of said laser.

7. The device according to claim 6, wherein said sensing device contains an optical receiver for sensing said laser pulse.

8. The device according to claim 1, wherein said control device has a comparator for comparing a picked-up energy with a limiting value.

9. The device according to claim 8, including a power supply supplying power to said laser, and said control device disconnects said laser from said power supply if the limiting value is exceeded.

10. The device according to claim 1, including a control and evaluation unit for controlling said laser and for evaluating laser pulses reflected by the object, and said control device and said control unit and evaluation unit are spatially separate from one another.

11. A method for sensing an object in an interior of a vehicle, which comprises:
   outputting a laser pulse into the interior of the vehicle via a laser;
   sensing a characteristic variable controlling a transmission energy of the laser resulting in a sensed characteristic variable; and
   performing one of reducing the transmission energy of the laser and preventing an emission of the laser pulse in dependence on the sensed characteristic variable.

* * * * *